(12) United States Patent
Dyulgerski (10) Patent No.: US 11,174,836 B2
(45) Date of Patent: Nov. 16, 2021

(54) ROTARY CONVERTER OF WIND ENERGY WITH A VERTICAL AXIS OF ROTATION

(71) Applicant: Aleksey Slavov Dyulgerski, Sofia (BG)

(72) Inventor: Aleksey Slavov Dyulgerski, Sofia (BG)

( * ) Notice: Subject to any disclaimer, the term of this patent is extended or adjusted under 35 U.S.C. 154(b) by 582 days.

(21) Appl. No.: 15/578,106

(22) PCT Filed: May 27, 2016

(86) PCT No.: PCT/EP2016/062073
§ 371 (c)(1),
(2) Date: Nov. 29, 2017

(87) PCT Pub. No.: WO2016/193172
PCT Pub. Date: Dec. 8, 2016

(65) Prior Publication Data
US 2018/0156194 A1    Jun. 7, 2018

(30) Foreign Application Priority Data

May 30, 2015  (GB) ..................................... 1509359

(51) Int. Cl.
*F03D 3/06*  (2006.01)
(52) U.S. Cl.
CPC ............. *F03D 3/068* (2013.01); *F03D 3/067* (2013.01); *Y02E 10/74* (2013.01)
(58) Field of Classification Search
CPC . F03D 3/06; F03D 3/061; F03D 3/062; F03D 3/064; F03D 3/067; F03D 3/068; F03D 7/022; F03D 7/0236
See application file for complete search history.

(56) References Cited

U.S. PATENT DOCUMENTS

| | | | |
|---|---|---|---|
| 1,371,204 A | 3/1921 | Ernest | |
| 4,457,669 A | 7/1984 | Corry | |
| 4,545,729 A * | 10/1985 | Storm | ........................ F03D 7/06 416/132 B |
| 4,684,817 A | 8/1987 | Goldwater | |
| 4,792,700 A * | 12/1988 | Ammons | ................. F03D 13/22 290/55 |
| 7,077,628 B1 | 7/2006 | Acord | |
| 2004/0228729 A1 | 11/2004 | Migler | |

(Continued)

FOREIGN PATENT DOCUMENTS

| | | |
|---|---|---|
| CN | 2228557 | 6/1996 |
| CN | 2334898 | 8/1999 |

(Continued)

*Primary Examiner* — J. Todd Newton
*Assistant Examiner* — Julian B Getachew
(74) *Attorney, Agent, or Firm* — Allen, Dyer, Doppelt + Gilchrist, P.A.

(57) ABSTRACT

A rotary converter of wind energy with a vertical axis of rotation includes a rotor with a vertical axis of rotation 4, which has two or more shovels 6 connected to a central body 5 and/or to each other. The shovels called "working" shovels have wind-permeable structure 2. On one side of the shovels is formed a working surface. It is formed on same side of all working shovels by a flag or flags 1 of which the structure limits the capability to take the direction of the air flow, meeting with this side of the shovels. By this surface, the shovels catch the wind energy and convert it to a rotational motion of the rotor. The shovel's load and the rotor speed can be regulated.

11 Claims, 10 Drawing Sheets

(56) References Cited

U.S. PATENT DOCUMENTS

| | | |
|---|---|---|
| 2009/0160188 A1 | 6/2009 | Migler |
| 2012/0328435 A1 | 12/2012 | Crocker et al. |
| 2013/0323056 A1 | 12/2013 | Su |

FOREIGN PATENT DOCUMENTS

| | | |
|---|---|---|
| CN | 101230837 | 7/2008 |
| CN | 104265562 | 1/2015 |
| DE | 3602414 | 7/1987 |
| GN | 201621014 | 11/2010 |
| GN | 204200471 | 3/2015 |
| JP | 5413757 | 2/2014 |
| KR | 1020090106270 | 10/2009 |
| KR | 2020120000584 | 1/2012 |
| KR | 1020130053009 | 5/2013 |
| WO | 0186140 | 11/2001 |
| WO | 2010077036 | 7/2010 |

* cited by examiner

ROTARY CONVERTER OF WIND ENERGY WITH A VERTICAL AXIS OF ROTATION

This invention relates to a device for converting wind power into a rotational motion of a rotor with a vertical axis of rotation.

The preservation of nature and the depletion of energy resources increases the demand for renewable energy sources. The use of wind power for the production of electricity is one of the possible alternatives of the environment-polluting methods. When applying wind power, the kinetic energy of the wind is most often converted into rotational motion of a rotor, which drives an electrical generator. Horizontal-axis wind turbines are the devices most often employed to convert wind energy in to electrical power. They also hold the main share in wind energy production. The large size of horizontal-axis wind turbines which their blades can reach is one of the advantages which they have. This allows them to catch and convert significant quantities of wind energy.

Their principal of work, however, has some disadvantages. For the appearance of a torque, the blades of the rotors should meet the airflow at a certain angle, in order to make a torque occur. Maintaining an angle of attack within a certain set of limits requires installation of a specific system that monitors any changes in wind speed and direction. The system would adjust the blade pitch in order to provide the optimum angle of attack of the blades.

Nevertheless, the efficiency sharply decreases in cases when the passing through the range of the rotor airflow has different parameters. Most often such parameters have winds blowing near the land surface. Land masses cause winds to change their speed and direction. To avoid these air flows, the rotors with horizontal axis of rotation are raised high above the ground, in search of stronger and permanent airflows.

All this makes construction and operation of horizontal-axis wind turbines expensive and affects the cost of electricity produced by them. At the same time, ground winds with significant energy, which passes into the space between the rotors and the land surface, remains unused.

There are other types of converters of wind energy, including such with vertical axis of rotation. Their possibilities and their effectiveness, however haven't allowed them to receive wide range of use. The a reason for this is their inability to convert large amounts of wind energy.

STATEMENT OF INVENTION

To overcome or mitigate these problems, the present invention proposes a rotary converter of wind energy with a vertical axis of rotation, having shovels with a variable flag-formed working surface.

The variable flag-formed working surface of the shovels allows them to have different drag depending which sides of the shovels are facing the wind.

According to a first aspect there is provided a rotary converter of wind energy having a vertical axis of rotation, comprising: a plurality of shovels, each shovel having a wind permeable structure; the wind permeable structure of each shovel configured for mounting thereon at least one flag, the at least one flag configured to form a variable flag-formed working surface when a wind force is incident on a side of the shovel on which the at least one flag is located; each flag having a flag arm configured to maintain a shape of a respective flag attached to the flag arm; wherein the rotary converter is configured such that a configuration of one or more of the shovels can be selectively varied such that a value of a wind force acting on the shovels can be selectively controlled by changing a position of one or more of the shovels on the rotary wind converter, and/or changing a value of an effective size of the variable flag-formed working surface on one or more of the shovels on the rotary wind convertor.

According to some embodiments, in use, the variable flag formed working surface is configured to project or extend in a direction of rotation of the rotary wind converter. According to some embodiments, selectively varying the configuration of the one or more shovels comprises changing a position of one of the shovels relative to another of the shovels. According to some embodiments changing a position of one of the shovels relative to another of the shovels comprises changing an interval between the shovels. According to some embodiments the interval comprises a circumferential interval. According to some embodiments, each shovel has a first side and a second side. According to some embodiments, when the rotary wind converter is rotating in a first direction of rotation each of said first sides comprises a leading side of its respective shovel, and each of said second sides comprises a trailing side of its respective shovel. According to some embodiments the flags are, at rest, located on the same side of each shovel. According to some embodiments, the changing a value of an effective size of the variable flag-formed working surface on one or more of the shovels comprises changing a location of one or more of the flags and/or changing a location of the wind permeable structure. According to some embodiments, changing a location of one or more of the flags comprises moving one or more of the flags between a first position and a second position. According to some embodiments the moving one or more of the flags between a first position and a second position comprises rotating the one or more flags about a respective flag pole. According to some embodiments, changing a value of an effective size of the variable flag-formed working surface on one or more of the shovels comprises changing an effective size of one or more flags and/or a size of the wind permeable structure. According to some embodiments, changing an effective size of one or more flags comprises winding or unwinding the one or more flags around a respective flagpole. According to some embodiments, the flag arms are configured to enable respective flags to be selectively wound or unwound around respective flagpoles. According to some embodiments, an effective size of one or more flags can be changed by being selectively wound or unwound around the respective flagpoles. According to some embodiments, the flag arms comprise a pullable rope, cord or other pullable connection attached to an upper end of a respective flag and which are operable to maintain a shape of the flag during its winding or unwinding around the respective flagpole. According to some embodiments, adjacent flag arms are connected to each other by connections, wherein the connections are configured to prevent overlapping of the flag arms and/or the flags. According to some embodiments, each flag arm comprises an axis of rotation, each flag arm being partially or fully balanced respective to its axis of rotation by an additional weight. According to some embodiments, the flagpoles include a rope or another tensioned connection passing through the flagpoles to prevent the flagpoles from bending. According to some embodiments, the wind permeable structure of the shovels comprises one or more ropes and/or other tensioned connections which pass freely through one or more pipes. According to some embodiments, the shovels are configured to rotate around structural elements of another device or another facility. According to some embodiments, the shovels are configured to rotate around a supporting tower of a wind turbine having a horizontal axis of rotation. According to some embodiments, the variable flag-formed working surface of one or more shovels is used as a carrier of information and/or for displaying information. According to some embodiments, the variable flag-formed working surface of one or more shovels is used as a carrier of information and/or for displaying information with advertising and/or commercial content. According to some embodiments, in a rest or non-working position the flag(s) are spaced from or open with respect to the wind permeable structure of a shovel on which the flag(s) are located. In a working position at which the flag(s) "catch" the air flow the flag(s) may be closed or pressed against a wind permeable structure of a shovel on which the flag(s) are located. Although located on a particular side of a respective shovel, in some embodiments during use a flag may move over or partially move over to the other side. For example, although located on a first side of a shovel when in a rest or non-working position, during use and when forming a working surface a flag or flags may bow out or curve out in to the second side of the shovel. Or it may be considered that the flag always remains on the same side of a wind permeable structure, but the wind permeable structure can flex and bow out or curve out when the working surface of a flag is pressed against it. In this manner the rotary wind converter can be caused to rotate in variety of wind conditions. Where reference is made to changing a size of a flag this may be considered changing an effective size of the flag, or in other words a size of the flag that is capable of reacting to a wind force at a given time. That is although the total actual size of the flag may remains the same, the amount or area of the flag that is exposed to form a working surface can vary. In some embodiments the exposed size may be considered the effective size.

According to a second aspect there is provided a rotary converter of wind energy having a vertical axis of rotation, comprising a plurality of shovels having a wind permeable structure, the wind permeable structure of two or more shovels giving possibility of plurality of flags which are placed from one side of each shovel to form a variable flag-formed working surface thereon, when the shovel meets the wind with this side; the flags are placed on the same side of the shovels relative to the direction of rotation; the flags have a flag arms to maintain a shape of respective flag attached to the flag arm; wherein the rotary convertor is configured such that a configuration of one or more of the shovels can be selectively varied such that a value of wind force acting on the shovels can be selectively controlled by changing a position of the one or more shovels on the rotary wind converter and/or changing a value of an maximum size of the variable flag-formed working surface on one or more shovels on the rotary wind convertor.

According to a third aspect there is provided a rotary converter of wind energy with a vertical axis of rotation having shovels with variable flag-formed working surface. According to some embodiments, the variable flag-formed working surface is formed on the same side of the all working shovels having the wind permeable structure which limits the capability of the flag or flags to take the direction of the air flow, meeting with this side of the shovels. According to some embodiments, some or all of the working shovels have curved shape in direction opposite to their rotation. According to some embodiments, some or all of the working shovels have surfaces preventing air leakage above and below the shovel from high pressure zone. According to some embodiments, the wind impact over some or all of the working shovels can be controlled. According to some embodiments, the size of the variable flag formed working surface on some or all of the working shovels can be controlled. According to some embodiments, the size of the variable flag formed working surface on some or all of the working shovels can be controlled by changing the size of the flags. According to some embodiments, the size of some or all flags can be changed by winding the flags around the flagpoles, or unwinding. According to some embodiments, the size of the variable flag formed working surface on some or all of the shovels can be controlled by changing the disposal of the flags. According to some embodiments, the size of the variable flag formed working surface on some or all of the shovels can be controlled by changing the size of the wind permeable structure. According to some embodiments, the sizes of the variable flag formed working surface on some or all of the shovels can be controlled by changing the disposal of the wind permeable structure. According to some embodiments, the impact of the wind and torque on the shovels can be controlled by changing the shape of the shovels. According to some embodiments, the impact of the wind on the shovels can be controlled by changing the disposal of the shovels. According to some embodiments, the size of the flags can be changed by folding and unfolding the flags up and down. According to some embodiments, the flags are attached to poles through which are tensioned connections, preventing the bending of the poles. According to some embodiments, the flags are having flagarms or other devices keeping the shape of the flags. According to some embodiments, the adjacent flag arms or other devices keeping the shape of the flags, are connected to each other behind their axis of rotation, with connections preventing their overlapping. According to some embodiments, the flags are having flag arms, which allows the flags to be winding around the poles or unwinding. According to some embodiments, the flagarms have pulling rope, cord or other pulling connection, which keeps the shape of the flag during its winding around the pole or unwinding. According to some embodiments, the pulling connection is winding and unwinding in opposite direction of the flag winding and unwinding.

According to a fourth aspect there is provided a rotary converter of wind energy having a vertical axis of rotation, comprising a plurality of shovels having a wind permeable structure, the wind permeable structure of two or more shovels giving possibility of plurality of flags which are placed from one side of each shovel to form a variable flag-formed working surface thereon, when the shovel meets the wind with this side; the flags are placed on the same side of the shovels relative to the direction of rotation; the flags have a flag arms to maintain a shape of respective flag attached to the flag arm; wherein the rotary convertor is configured such that a configuration of one or more of the shovels can be selectively varied such that a value of wind force acting on the shovels can be selectively controlled by changing a position of the one or more shovels on the rotary wind converter and/or changing a value of an maximum size of the variable flag-formed working surface on one or more shovels on the rotary wind convertor. According to some embodiments, selectively varying configuration of the one or more shovels comprises changing a position of the one or more shovels compared to the other shovels on the rotary wind converter. According to some embodiments the value on maximum size of the variable flag-formed working surface on one or more shovels can be changed by changing location of one or more flags and/or location of the wind permeable structure which is giving possibility of the flags to form a variable flag-formed working surface. According to some embodiments the value on maximum size of the variable flag-formed working surface on one or more shovels can be changed by changing the size of one or more flags and/or size of wind permeable structure which is giving possibility of the flags to form a variable flag-formed working surface. According to some embodiments a size of one or more flags can be changed by being selectively wound or unwound around the respective flagpoles. According to some embodiments the flag arms are configured to enable the respective flags to be selectively wound or unwound around respective flagpoles. According to some embodiments the flag arms comprise a pullable rope, cord or other pullable connection attached to an upper end of a respective flag and which are operable to maintain a shape of the flag during its winding or unwinding around the respective flagpole. According to some embodiments the pullable connection of the flag arm is configured to wind around the flagpole when the flag is unwinding, and pullable connection is configured to unwind when the flag is winding around the flagpole. According to some embodiments adjacent flag arms are connected to each other by connections, wherein the connections are configured to prevent overlapping of the flag arms and/or the flags. According to some embodiments each flag arm comprises axis of rotation are partially or fully balanced respective the axis of rotation by additional weight. According to some embodiments the flagpoles include a rope or another tensioned and passing through it connection to prevent the flagpoles from bending. According to some embodiments a wind permeable structure of the shovels comprises one or more ropes and/or other tensioned connections which pass freely trough pipes. According to some embodiments the shovels are configured to rotate around structural elements of another device or another facility. According to some embodiments the shovels are configured to rotate around a supporting tower of a wind turbine having horizontal axis of rotation. According to some embodiments the variable flag-formed working surface of one or more shovels is used as carrier of information and/or displaying information. According to some embodiments the variable flag-formed working surface of one or more shovels is used as carrier of information and/or displaying information with advertising and/or commercial content.

DETAILED DESCRIPTION

Figure 1:
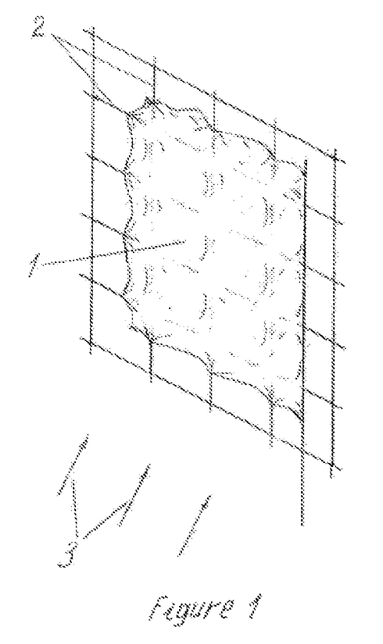
FIG. 1 shows what the variable flag-formed surface is, according to an embodiment.

FIG. 1 shows a flag 1 and wind-permeable structure 2, which limits the capability of the flag to take the direction of the wind 3 into certain directions. Pressed to the structure, the flag forms a surface, which prevents the passage of the air flow. This surface increases the air resistance of the structure and the impact of the wind on it. The surface is variable because its forming depends on the capability of the flag to take the direction of the airflow. When the flag has this capability, such surface is not formed. The airflow passes through the structure by meeting minimum resistance. The variable flag-formed surface changes the air resistance as well as the impact of the wind to the structure. When this impact causes a movement of the structure, this surface is called "working surface", or "variable flag-formed working surface".

Figure 2:
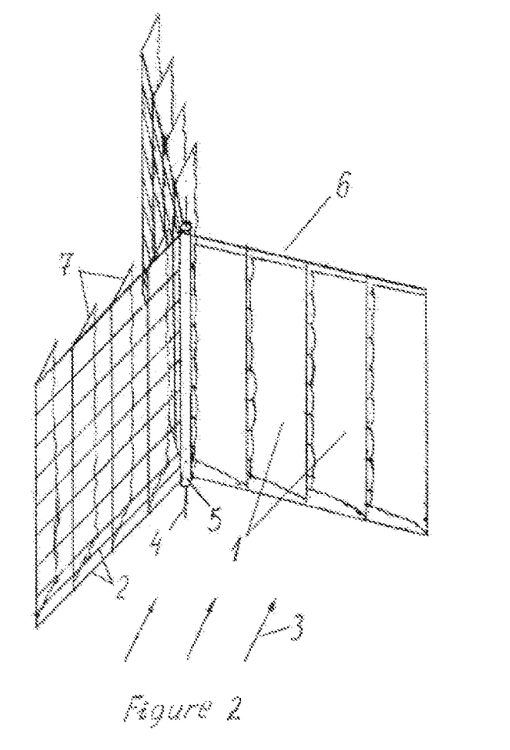
FIG. 2 shows a rotary converter of wind energy with a vertical axis of rotation, having shovels with a variable flag-formed working surface, according to on embodiment.

FIG. 2 shows a rotary converter of wind energy with a vertical axis of rotation, having shovels with a variable flag-formed working surface. The convertor includes a rotor with a vertical axis of rotation 4, which has two or more shovels 6 connected to a central body 5 and/or to each other. The shovels called "working shovels" have wind-permeable structure 2, on one side of which is formed a working surface. The working surface is formed by a flag or flags 1 which are limited by the structure to take the direction of the air flow, meeting with this side of the shovel. As a result, the air resistance of the shovel increases and aerodynamic force tending to rotate the shovel around the rotor axis occurs.

Working surface is not formed when the shovel meets the airflow with its other side. Then the airflow goes through the structure and the flags have capability to take the airflow direction, thus affecting a low drag.

The working surface is formed on the same side of all working shovels, relative to the direction of rotation.

Due to this, the shovels will cause different resistance of the air flow passing through the both sides of the rotor axis, because they are facing it with different sides. The different air resistance leads to a difference in the forces acting on the both sides of the rotor axis. The torque arising from this deference causes the rotor to rotate converting the kinetic energy of wind into a rotational motion.

With the increasing speed of the rotor, the difference in the acting forces decreases. When the forces are in balance, depending on wind speed, the speed of the rotor stabilizes at a certain value. Maintaining this value within a certain limits is essential for the safe operation of the facility in real conditions.

Converter of this kind can be of a different configuration, shape and number of the working shovels. The flags forming the working surface may also vary in shape, number and position. They could have rotating flag arms 7 or other devices for keeping the flag shape.

When the flags are arranged next to each other, due to their different distance from the axis of the rotor, they have different peripheral speeds. This creates certain consistency in their orientation into the air flow direction. This sequence prevents overlapping of adjacent flags. Furthermore, it allows the shovels to have a shape curved in the direction opposite to the rotation. Curved shovels capture and convert wind energy more efficiently.

In order to maintain the increased air pressure of wind on one side of the shovel, the upper and the lower part of the shovel may be equipped with surfaces that prevent air leakage from this area.

Figure 3:
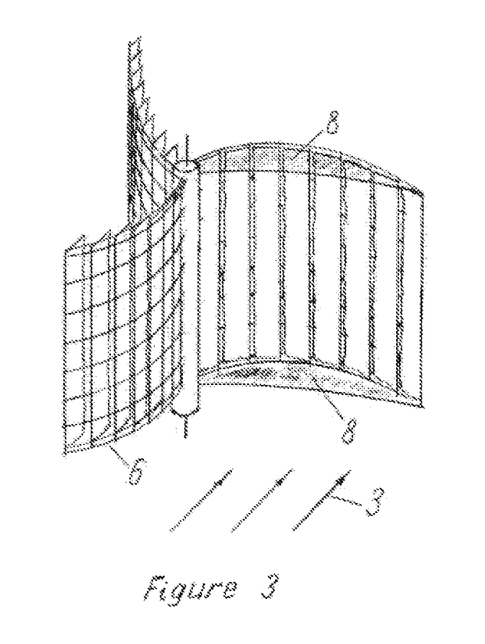
FIG. 3 shows a converter with a curved shape of the working shovels and the location of the surfaces preventing the air leakage above and below the shovel, according to an embodiment.

FIG. 3 shows a converter with curved shape of the working shovels and the location of the surfaces preventing the air leakage above and below the shovel.

FIG. 3 shows a converter with a curved form of the working shovels 6, in direction opposite to their rotation. On the upper and lower part of one of the shovels there are elements 8 preventing leakage of air above and below the shovel.

When rotating flag arms or other devices are used for keeping the shape of the flags, the adjacent devices can be connected to each other behind their axis of rotation, with connections that have suitable length and elasticity. This will exclude the possibility of overlapping of adjacent devices even under the influence of random factors.

To avoid the influence of centrifugal forces caused by the rotation of the rotor, the flag arms or the other shape-keeping devices can be partially or completely balanced about their own axis of rotation.

Figure 4:
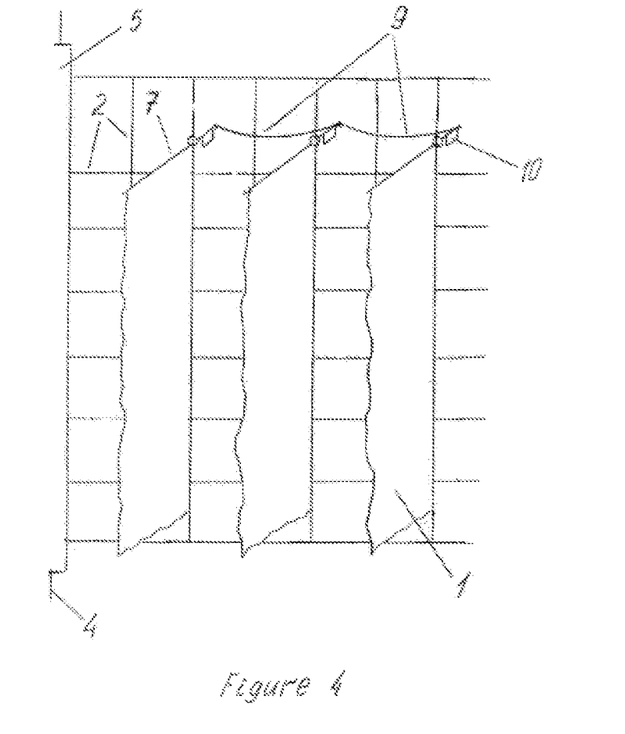
FIG. 4 shows a connection of adjacent flag arms which prevent overlapping of the the flag arms, and their balancing, according to an embodiment.

FIG. 4 shows a connection of adjacent flag arms and their balancing.

FIG. 4 shows adjacent flag arms 7 which are connected behind their axes of rotation with connections 9 preventing their overlapping. Balancing of flag arms is ensured by weights 10 located behind their axes.

The winds blowing in real conditions have different speed and power. Under their pressure the rotor speed can reach values that endanger the safe operation of the facility. A variety of protective features can be employed to limit the increasing speed of the rotor. The usage of external mechanisms and devices that counteract the rotation is one of the possible ways to limit the rotor speed.

However, this would increase the shovels load. Maintaining this load within the certain limits is possible by reducing the wind force acting on the shovels.

The flag-formed working surface of the shovels takes on the most of wind force. The ability to change the size of the working surface will allow us to change wind force acting on the shovels.

The working surface of the shovels is formed of flags pressed to the structure that limits their capability to take the direction of the wind. We can manage the process of working surface formation and its sizes by changing the sizes of the flags, by changing the sizes of the structure or by changing the location of the flags and/or the structure.

Figure 5:
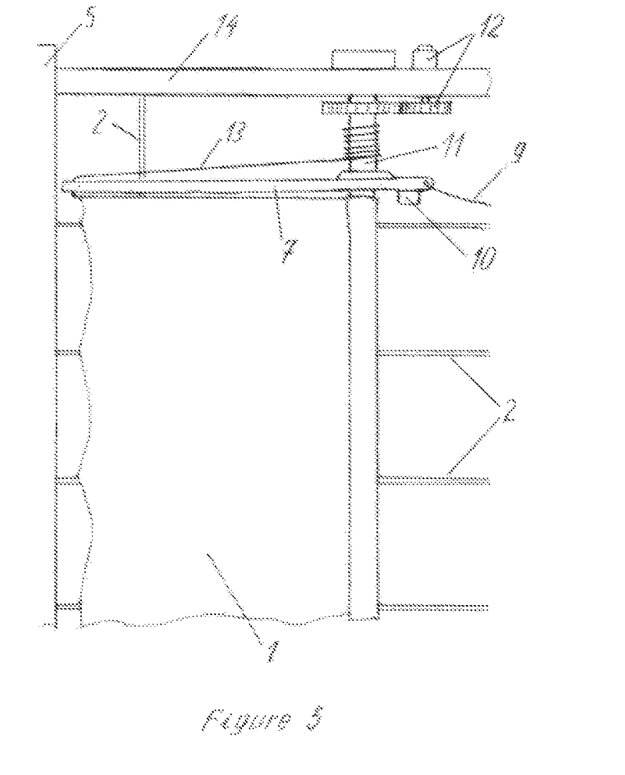
FIG. 5 shows one of the possible schemes for change the size of a flag by winding the flag around the flag pole or unwinding, according to an embodiment.

Change in the size of the flags, would change the size of the working surface—for example, by folding and unfolding the flags or winding the flags around flagpoles or unwinding (FIG. 5).

Change in the size of the structure that limits the flag's capability to take the direction of the wind would change the size of the working surface formed on it—for example, by relocating or removing elements of the structure.

Change in the location of the flags and/or the structure, would change the formation of the working surface and its location—for example, by a change in the distance between the flags and the structure. (FIG. 6)

Except through managing the formation of working surface, the impact of the wind on the shovels and torque can be limited by changing the position and/or the shape of one or more shovels. (FIG. 7)

FIG. 5 shows one of the possible schemes for change the size of a flag by winding the flag around the flag pole or unwinding.

Figure 6:
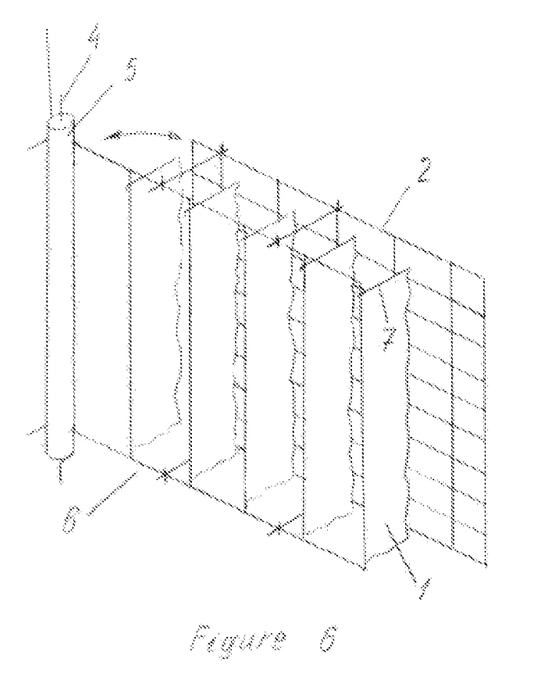
FIG. 6 shows one of the possible schemes for controlling the formation of working surface, and its dimensions by changing the location of the flags and/or the structure, according to an embodiment.

FIG. 6 shows one of the possible schemes for controlling the formation of working surface, and its dimensions by changing the location of the flags and/or the structure.

Figure 7:
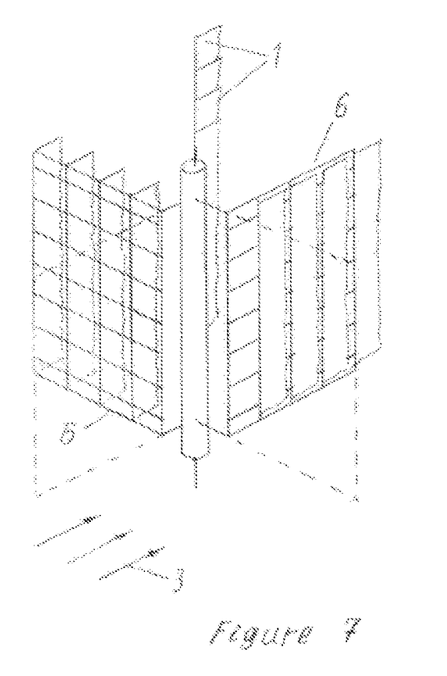
FIG. 7 shows one of the possible ways to reduce the impact of the wind on the shovels and eliminate the torque by changing the position (and/or the shape) of the shovels, according to an embodiment.

FIG. 7 shows one of the possible ways to reduce the impact of the wind on the shovels and eliminate the torque by changing the position (and/or the shape) of the shovels.

FIG. 5 shows a flag 1 with flag pole 11 which is attached to the upper frame or arm 14 of the shovel so that with the help of external devise 12 it has the capability to rotate around its own axis. During the rotation of the pole, the flag is winding around it or unwinding. To keep the shape of the flag, it is attached to flag arm 7. With the help of connection 13 the proper winding and unwinding of the flag is ensured. The connection pulls the flag towards the end of the flag arm by which it goes free. At its other end the connection is attached in a way that it winds and unwinds in direction opposite of the flag. When the pole rotates and the flag begins to wind around it, the connection unwinds and the opposite—when the flag unwinds, the connection winds. A tensioning mechanism is possible to be used, as an additional or primary means for stretching the connection.

FIG. 6 shows a shovel 6 having movable attached wind permeable structure 2, which under the impact of the wind onto the working surface and/or influence of the centrifugal forces when they reach certain values has moved away from the rotor axis and from the flags. This allows the flags to take the wind direction causing reduction of the wind impact over the shovel, because a working surface is not formed. The same scheme can be used to move the flags, if the flagpoles are movable attached in a similar way.

FIG. 7 shows a rotor with three shovels, the position of two of which has been changed. As a result of this the interval between the shovels is changed so as to break the sequence in the formation of a working surface onto the shovels, and interrupts maintaining torque, which will lead to the termination of the rotation. The rotor will act as a weather vane. This will reduce the impact of the wind on the shovels. Technical implementation can be done in many ways. In this case, the attachment of the shovels allows them to change their position relative to one another as are rotated in the direction of the wind, when its impact reaches certain values, respectively to one side and other side of the shovel. Some of the aforementioned approaches for limiting or reducing shovels and rotor loading from wind force are suitable for devices with small shovels, while others can be used in facilities with large shovels.

Extraction of large amounts of wind power requires construction of converters with a big size of the shovels. This is connected with the overcome of some technical difficulties. The shovels of such facilities must have a relatively light and strong structure, with big difference in drag coefficients in working and nonworking position, thus giving them a high efficiency and wide operation range. At the same time they must be resistant to strong and stormy winds. The use of shovels with a variable flag-formed working surface in combination with some of the methods to reduce the impact of wind, will allow the creation of a converter with big-sized shovels.

We will review one of the possibilities for creation this type of big-sized shovel. The shovel will be with a variable flag-formed working surface, which size could be managed. For this purpose, the flags will be able to wind around the flagpoles or unwind. In this way the impact of the wind onto the shovel will be regulated. For further clarity, the way of creation the wind-permeable structure of the shovel and the ways of attachment of the flagpoles with the flags to the shovel are shown in separate figures.

Figure 8:
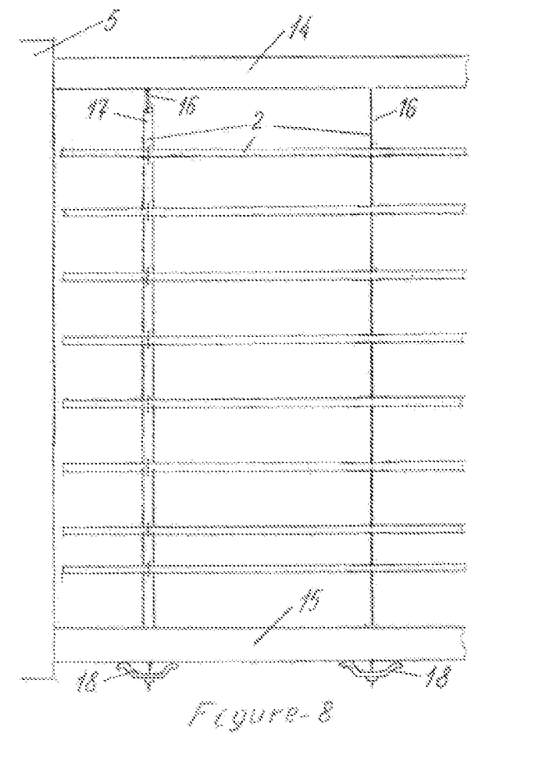
FIG. 8 shows a structure of a shovel allowing the formation of a working surface with large sizes, according to an embodiment.

FIG. 8 shows a structure of a shovel allowing the formation of a working surface with large sizes.

Figure 9:
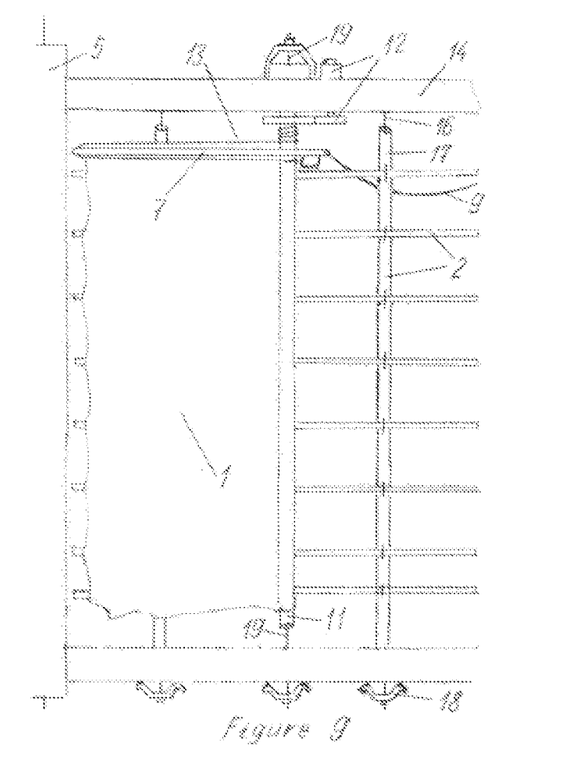
FIG. 9 shows a way of attachment of a flagpole with a flag to the shovel, allowing the pole to reach big length, and the flag to change its size by winding around the pole or unwinding, according to an embodiment.

FIG. 9 shows a way of attachment of a flagpole with a flag to the shovel, allowing the pole to reach big length, and the flag to change its size by winding around the pole or unwinding.

In FIG. 8 is an illustration of a shovel which has an external frame or comprises an upper 14 and lower 15 arm connected to the central body 5 of a rotor with a vertical axis of rotation. For creation of a wind-permeable structure 2 which can resist to the load caused by the wind, guy ropes 16 or other strong enough type connections are tensioned between the upper and the lower frame or the upper and lower arm. They may be linked with the help of springy elements 18 to ensure that the connections stay taut at long term. In order not to affect their tension on the location of the other elements of the wind-permeable structure, these ropes or connections can be passed through pipes 17 or through other elements allowing their independent tension. Attachment and positioning of the wind-permeable structure must allow the formation of a working surface on it. The shovels may comprise several sections constructed in the manner described.

FIG. 9 shows a flagpole 11 with a flag 1 attached to one of the sides of the shovel's wind-permeable structure 2. The pole is attached to the upper frame or arm 14 of the shovel in way allowing its rotation. In this case it is done from an external gear 12. The shape of the flag is kept by flag arm 7. Proper winding and unwinding of the flag is provided by the pulling connection 13. (Us it was reviewed in FIG. 5) To reduce the deflection of the pole under the effect of external forces, trough it is tensioned connection 19. The connection 19 is tensioned between the upper 14 and the lower 15 arm or frame of the shovel and allows the pole rotation. It gives an opportunity for the usage of poles with big length and the formation of a controlled working surface on shovels with big size.

The variable flag-formed working surface with manageable size, will allow regulating the impact of the wind on the shovel.

When the flags are not winded around the poles, they will form working surface with a maximum range, capturing the power of even the weakest winds. This will make these convertors suitable for installation in regions with weak wind activity. If wind gets strong and wind load needs to be reduced, the working surface can be decreased by winding the flags around the flag poles. The partial winding of the flags will widen the working range of the convertor, allowing it to function during winds with significant force. During fully retraction of the flags, the air resistance of the shovels is minimized. This will minimize wind load on the shovels and will allow strong winds with speed exceeding working limits multiple times to withstood.

The shovels themselves may be with a curved shape in direction opposite of spinning. They may also have surfaces preventing air leakage, as shown in FIG. 4.

The rotary converter of wind energy with a vertical axis of rotation, having shovels with variable flag-formed working surface, may have a different size, shape and structure. Its rotation gives the opportunity for further conversion and usage of wind energy. Except for the movement of different mechanisms, gears and aggregates, it can also find application in other areas. The flag-formed working surface, as well as the flags themselves can be used as carriers of information, or can be used for displaying information with various in content and purpose. The large area of deployment, as well as the specific way of presentation of this information, provides good opportunities for its exploitation in the advertising area. Except stationary basing, the convertors also can be with non stationary or mobile basing.

The production of electric energy from the wind is one of the areas that best manifests the advantages of the above described type of wind energy converter. Its work does not depend on the direction of the wind, neither on any changes in it. The same applies to change in wind speed in the working range. The possibility to create shovels with large sizes, allows the conversion of large quantities wind energy. The wide working range and the efficient operation even during variable and low speed winds, makes it suitable for use in areas where such winds predominate. Such parameters have the winds blowing near the land surface. Even though they contain significant amounts of energy, they are avoided by the big horizontal-axis wind turbines, and flow in the free space between their rotors and the land surface.

The deployment in this space of a rotary converters of wind energy with vertical axis of rotation of this type, will allow the conversion and the use of the energy of such winds. Except working separately, they may also function together with horizontal-axis wind turbines.

From a technical point of view it is not a problem for the rotor of a converter with a vertical axis of rotation to rotate around a supporting tower of the turbine with a horizontal axis of rotation. The implementation of such scheme will give an opportunity for their joint usage and their mutual complementation. This may happen with additional building to the yet existing facilities, and also with their integrated construction.

Figure 10:
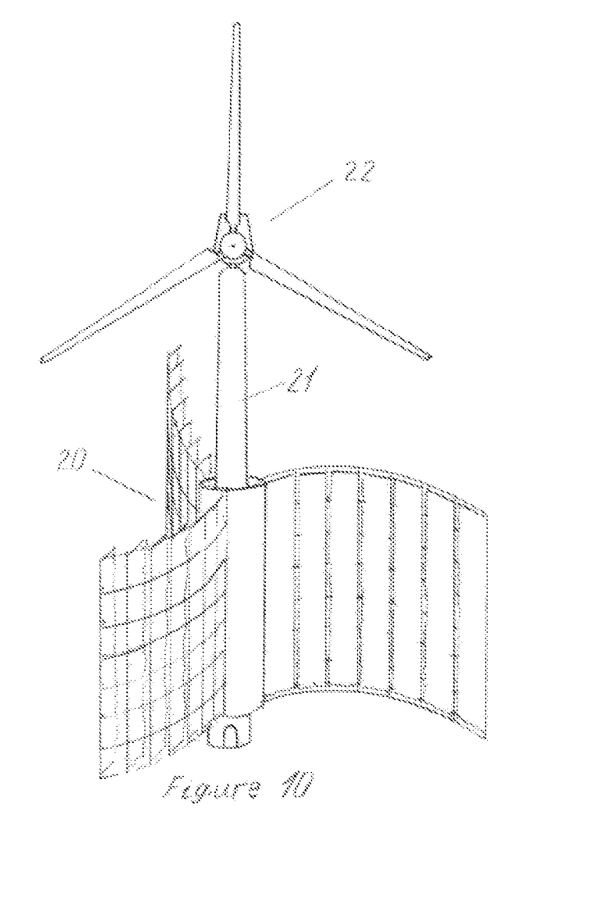
FIG. 10 shows a joint usage of a rotary converter of wind energy with vertical axis of rotation, having shovels with a variable flag-formed working surface, and a wind turbine with a horizontal axis of rotation, according to an embodiment.

FIG. 10 shows a joint usage of a rotary converter of wind energy with vertical axis of rotation, having shovels with a variable flag-formed working surface, and a wind turbine with a horizontal axis of rotation.

FIG. 10 shows a rotary converter of wind energy with a vertical axis of rotation 20 the rotor of which rotates around the supporting tower 21 of the wind turbine with a horizontal axis of rotation 22.

The joint usage of both types of convertors will increase the amount of the electric energy produced, it will widen the working range and will improve the efficiency. It will make this production profitable in regions with weaker wind activity.

The invention claimed is:

1. A rotary converter of wind energy having a vertical axis of rotation, comprising:
   a plurality of flags;
   a plurality of flagpoles comprising a flagpole for each of the plurality of flags;
   a plurality of flag arms comprising a flag arm for each of the plurality of flags;
   a plurality of shovels each having a wind permeable structure, the wind permeable structure of each shovel configured to allow the plurality of flags which are placed on a first side of each shovel to form a variable flag-formed working surface on the first side of each shovel, when each shovel of the plurality of shovels meets the wind with the first side;

wherein the first side of each shovel is on a same side of each shovel relative to a direction of rotation;

wherein each of the shovels comprises a second side opposite the first side, and wherein when each shovel of the plurality of shovels meets the wind with the second side then the wind passes through the wind permeable structure of the shovel and the flags rotate away from the shovel in the direction of the wind;

wherein the rotary convertor is configured such that a configuration of one or more of the shovels can be selectively varied such that a value of wind force acting on the shovels can be selectively controlled by at least one of changing a position of the one or more of the shovels on the rotary converter and changing a maximum size of the variable flag-formed working surface on the one or more of the shovels on the rotary convertor;

wherein the maximum size of the variable flag-formed working surface on the one or more of the shovels can be changed by at least one of changing a size of one or more flags and changing the size of a wind permeable structure of the one or more of the shovels;

wherein the size of each of the one or more flags can be changed by selectively winding or unwinding each of the one or more flags around a respective flagpole, wherein a side edge of each of the one or more flags is attached to the respective flagpole;

wherein the flag arm for each of the one or more flags is attached to each of the one or more flags, and wherein the flag arm for each of the one or more flags is positioned at a top edge of each of the one or more flags;

wherein the respective flag arm of each of the one or more flags is configured to rotate with the flag away from the respective shovel in the direction of the wind;

wherein the flag arm of each of the one or more flags is configured to enable each of the one or more flags to be selectively wound or unwound around the respective flagpole; and wherein the flag arm of each of the one or more flags is configured to maintain a shape of the flag attached to the flag arm.

2. A rotary convertor of wind energy as set forth in claim 1, in which each of the plurality of flag arms are attached to a pullable rope, a pullable cord or other pullable connection attached to an upper end of a respective flag and which is operable to maintain a shape of the respective flag during its winding or unwinding around the respective flagpole.

3. A rotary convertor of wind energy as set forth in claim 2, in which the pullable rope, the pullable cord or other pullable connection of each of the plurality of flag arms is configured to wind around the respective flagpole when the flag is unwinding, and the pullable rope, the pullable cord or other pullable connection is configured to unwind when the flag is winding around the respective flagpole.

4. A rotary convertor of wind energy as set forth in claim 3, wherein each flag arm of the plurality of flag arms comprises an axis of rotation, and wherein each flag arm of the plurality of flag arms is partially or fully balanced with respect to the axis of rotation by additional weight.

5. A rotary convertor of wind energy as set forth in claim 1, in which adjacent flag arms are connected to each other by connections, wherein the connections are configured to prevent overlapping of the flag arms and/or the flags.

6. A rotary convertor of wind energy as set forth in claim 1, in which at least one flagpole of the plurality of flagpoles includes a rope or another tensioned connection to prevent the at least one flagpole from bending.

7. A rotary convertor of wind energy as set forth in claim 1, wherein the wind permeable structure of each of the shovels comprises one or more ropes or other tensioned connections which pass freely through pipes of the wind permeable structure.

8. A rotary convertor of wind energy as set forth in claim 1, in which the shovels are configured to rotate around structural elements of another device or another facility.

9. A rotary convertor of wind energy as set forth in claim 1, in which the shovels are configured to rotate around a supporting tower of a wind turbine having a horizontal axis of rotation.

10. A rotary convertor of wind energy as set forth in claim 1, in which the variable flag-formed working surface of one or more of the shovels is used as a carrier of information and/or a display of information.

11. A rotary convertor of wind energy as set forth in claim 1, in which the variable flag-formed working surface of one or more of the shovels is used as a carrier of information and/or a display of information with advertising and/or commercial content.

* * * * *